United States Patent [19]
Yamaguchi et al.

[11] Patent Number: 5,604,013
[45] Date of Patent: Feb. 18, 1997

[54] MAGNETIC RECORDING MEDIUM AND RECORDING/REPRODUCING METHOD

[75] Inventors: Yushi Yamaguchi, Joetsu; Toshiya Naruto, Machida, both of Japan

[73] Assignee: Mitsubishi Chemical Corporation, Tokyo, Japan

[21] Appl. No.: 258,207

[22] Filed: Jun. 10, 1994

[51] Int. Cl.$^6$ .................. G11B 3/70; G11B 5/66; G11B 5/70

[52] U.S. Cl. .................. 428/141; 360/77.03; 369/44.26; 369/275.1; 369/277; 369/288; 428/694 B; 428/694 BS; 428/694 BR; 428/694 BN; 428/900; 428/913

[58] Field of Search .................. 428/141, 694 B, 428/694 BS, 694 BR, 694 BN, 693, 900, 928, 913; 360/135, 110, 113, 77.03, 77.05, 77.08; 369/44.26, 275.1, 277, 288

[56] References Cited

U.S. PATENT DOCUMENTS

| | | | |
|---|---|---|---|
| 4,528,240 | 7/1985 | Miyoshi et al. | 428/323 |
| 4,556,597 | 12/1985 | Best et al. | 428/201 |
| 4,684,547 | 8/1987 | Distefano et al. | 427/131 |
| 4,863,793 | 9/1989 | Ogawa et al. | 428/323 |
| 4,963,433 | 10/1990 | Ogawa et al. | 428/323 |

FOREIGN PATENT DOCUMENTS 0650157  4/1995  European Pat. Off. .

OTHER PUBLICATIONS

Database WPI, Derwent Publications, AN 84–220413/36, DE–A–3 403 822, Aug. 30, 1984, & US–A–4 528 240, Jul. 9, 1985.
Database WPI, Derwent Publications, AN 80–40476C/23, JP–A–55 055 431, Apr. 23, 1980.
Database WPI, Derwent Publications, AN 80–40477C/23, JP–A–55 055 432, Apr. 23, 1980, & JP–B–89 015 930, Mar. 22, 1989.
Database WPI, Derwent Publications, AN 80–55970C/32, JP–A–55 084 040, Jun. 24, 1980, & US–A–4 275 113, Jun. 23, 1981, & JP–B–89 020 488, Apr. 17, 1989.
Database WPI, Derwent Publications, AN 83–786794/41, JP–A–58 150 129, Sep. 6, 1983.
Database WPI, Derwent Publications, AN 91–038217/06, EP–A–411 242, Feb. 6, 1991, & US–A–5 079 096, Jan. 7, 1992.
Database WPI, Derwent Publications, AN 92–280557/34, JP–A–04 192 111, Jul. 10, 1992.

*Primary Examiner*—Paul J. Thibodeau
*Assistant Examiner*—Stephen Sand
*Attorney, Agent, or Firm*—Oblon, Spivak, McClelland, Maier & Neustadt, P.C.

[57] ABSTRACT

A magnetic recording medium comprising a non-magnetic transparent support, a magnetic layer, and a conductive intermediate layer formed between the non-magnetic transparent support and the magnetic layer, the conductive intermediate layer comprising, as major components, powder of conductive metal or metal compound and a binder resin, wherein:

the binder resin of the intermediate layer contains from 10 to 200 μeq/g of —$SO_3M$ group, —COOM group, —$PO_3M_2$ group, or —$NH_3^+X^-$ group, where M is a hydrogen atom, an alkali metal atom, or an alkaline earth metal atom, and X is a monovalent anion, and the ratio of the content of the powder of the conductive metal or metal compound to that of the binder resin, based on weight, in the conductive intermediate layer is from 8 to 13, and a recording/reproducing method.

8 Claims, 4 Drawing Sheets

MAGNETIC RECORDING MEDIUM AND RECORDING/REPRODUCING METHOD

BACKGROUND OF THE INVENTION

The present invention relates to a magnetic recording medium such as a floppy disk and a recording/reproducing method. Specifically, the present invention relates to a magnetic recording medium suitable for the positioning of a read/write head using an optical detection means and a recording/reproducing method using the magnetic recording medium.

A large amount of floppy disks has been used as a secondary storage medium to store data for computers and word processors. With typical floppy disk systems, positioning of a magnetic head is performed by an open-loop control using a stepping motor. This restricts further increase of a track density.

In recent years, magnetic recording media have been proposed that use optical servo techniques to achieve much higher track densities thereon. More specifically, an optical pattern is formed on a magnetic recording medium by means of forming a certain area having different optical characteristics from a reference area. A read/write head has an optical sensor integrally provided therewith to read the optical pattern. The sensed data is used as a tracking servo signal for positioning the head. This technique offers positioning of the head by a closed-loop control even with the floppy disk systems. Such fine positioning of the head permits realization of track densities higher by one digit than conventional ones.

The optical pattern for use in generating the tracking servo signal may be formed in various ways. For example, Japanese Patent Laid Open No. 2-31378 disclosed a method of forming a groove on a surface of a magnetic layer by means of laser or the like. International Application No. PCT/WO94/11867 proposes a method of adding dyes to a magnetic layer in the disk and focusing a beam on a certain spot thereon to cause reaction such as decomposition of the dyes at that spot, thereby changing the optical characteristics thereof. The beam may be a light beam such as a laser beam, an ultraviolet radiation, a strobo light (electronic flash), or an electron beam.

In the tracking servo system using such optical sensing means, a transparency of the magnetic recording medium is an important factor.

More specifically, an incident beam is focused on the magnetic recording medium. A portion of the incident beam is reflected from the medium and another portion is transmitted therethrough. The optical sensor typically detects either the reflected beam or the transmitted beam. The tracking servo signal is obtained according to a difference in light reflectance or light transmittance between the reference area and the area having the different optical characteristics. A problem occurs particularly when the optical sensor detects the transmitted light beam that the difference in light transmittance becomes extremely small when the magnetic recording medium has a low transparency, causing incorrect tracking. In tracking with the transmitted light beam, the light transmittance is approximately in proportion to the servo signal output. Accordingly, the transparency of the magnetic recording medium is the most important challenge that affects results of servo tracking on the magnetic recording medium.

The conventional floppy disks have magnetic layers containing carbon black in order to avoid electrification. While the carbon black contributes to imparting electrical conductivity to the layers, it badly affects the transparency thereof. The transmittance to light having a wavelength of 830 nm is as low as approximately 5%.

With this respect, it has been proposed to achieve satisfactory level of electrical conductivity without using the carbon black. To this end, an intermediate layer is provided between a magnetic layer and a non-magnetic support for supporting the magnetic layer. Conductive metals, metal compounds, or resins are contained in the intermediate layer to impart the electrical conductivity to the magnetic recording medium. The resultant magnetic recording medium has both the electrical conductivity and the transparency.

However, the present inventors hsve found, as a result of careful studies, that the magnetic recording medium of the type described still has a serious problem. The magnetic recording medium containing substantially no carbon black is inferior in surface roughness and has a low running resistance. It is thus difficult to satisfy fundamental characteristics required for the magnetic recording medium.

SUMMARY OF THE INVENTION

The present invention is directed to overcome the above mentioned problems, and an object thereof is to provide a magnetic recording medium which has good light transparency, anti-static properties, surface roughness, and running resistance, and which is suitable for positioning of a read/write head by using optical sensing means.

Another object of the present invention is to provide a method of recording and reproducing data on and from the above mentioned magnetic recording medium, in which accurate positioning of a read/write head is achieved by using optical sensing means without deteriorating fundamental characteristics of the magnetic recording medium such as electro-magnetic converting properties and durability.

According to an aspect of the present invention, it is provided with a magnetic recording medium comprising a magnetic layer, a non-magnetic transparent support, and a conductive intermediate layer formed between the magnetic layer and the non-magnetic transparent support, the intermediate layer comprising, as major components, powder of conductive metal or metal compound and a binder resin, wherein the binder resin of the intermediate layer contains from 10 to 200 µeq/g of —$SO_3M$ group, —COOM group, —$PO_3M_2$ group, or —$NH_3^+X^-$ group, where M is a hydrogen atom, an alkali metal atom, or an alkaline earth metal atom, and X is a monovalent anion, and the ratio of the content of the conductive metal or metal compound powder to that of the binder resin, based on weight, in the conductive intermediate layer is from 8 to 13.

According to another aspect of the present invention, it is provided with a recording/reproducing method for recording a magnetic signal on a magnetic recording medium and/or reproducing the magnetic signal recorded on the magnetic recording medium, the magnetic recording medium comprising a magnetic layer, a non-magnetic transparent support, and a conductive intermediate layer formed between the magnetic layer and the non-magnetic transparent support, the intermediate layer comprising, as major components, powder of conductive metal or metal compound and a binder resin, the binder resin of the intermediate layer containing from 10 to 200 µeq/g of —$SO_3M$ group, —COOM group, —$PO_3M_2$ group, or —$NH_3^+X^-$ group, where M is a hydrogen atom, an alkali metal atom, or an alkaline earth metal atom, and X is a monovalent anion, the ratio of the content of the conductive metal or metal compound powder to that of the binder resin, based on weight, in the conductive intermediate layer being from 8 to 13, wherein the recording/reproducing method comprises the steps of using a magnetic recording medium on which an optical pattern is recorded that is for use in generating a tracking servo signal distinguished from other portions by different optical characteristics thereof; and recording and reproducing a magnetic data while reading through optical means the optical pattern recorded on the magnetic recording medium to perform tracking by a read/write head.

DESCRIPTION OF THE PREFERRED EMBODIMENTS

The present invention is described in detail below.

Figure 1:
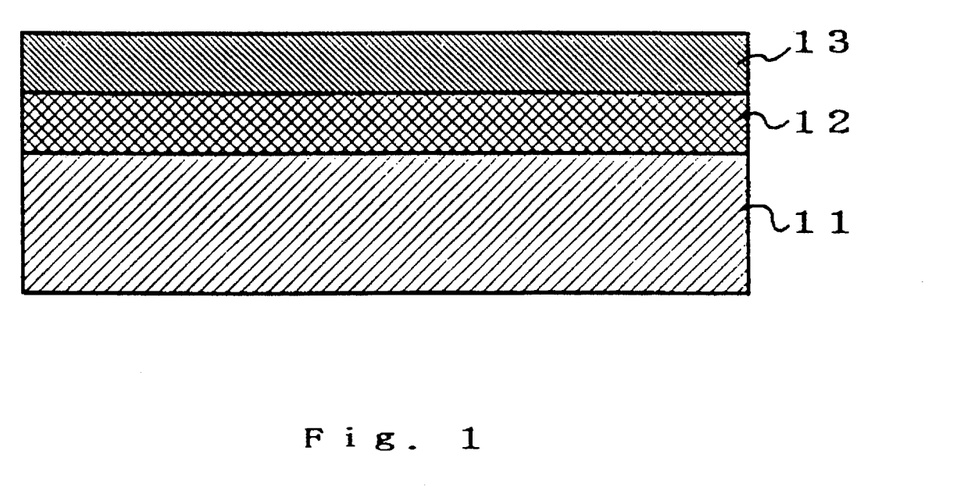
FIG. 1 is a sectional view of a magnetic recording medium according to the present invention for use in describing basic structure thereof, in which a reference numeral 11 represents a non-magnetic support, a reference numeral 12 represents a conductive intermediate layer, and a reference numeral 13 represents a magnetic layer.

FIG. 1 is a sectional view of a magnetic recording medium according to the present invention, in which illustration is a basic structure of the magnetic recording medium. A conductive intermediate layer 12 is provided on a non-magnetic transparent support 11. The term "conductive" layer used herein means that this layer has an electrical conductivity. A magnetic layer 13 is provided on the conductive intermediate layer 12. Any other layers may be formed along with these three essential layers. For example, an adherent layer may be formed between the non-magnetic support 11 and the conductive intermediate layer 12. In addition, a protective layer may be formed on the magnetic layer 13.

The magnetic layer may be formed at one or both sides of the non-magnetic support. With the magnetic recording medium having two magnetic layers formed at both sides of the non-magnetic support, it is preferable that two conductive intermediate layers are provided at both sides of the non-magnetic support, with being interposed between the non-magnetic support and the respective magnetic layers. When the magnetic layer is formed at one side of the non-magnetic support, a back layer may be formed on an opposite side to the magnetic layer.

The conductive intermediate layer 12 according to the present invention comprises, as major components, powder of a conductive metal or metal compound and a binder resin.

The conductive metal or metal compound used in the present invention is not limited to a specific one and may be any one of known metals or metal compounds having a good conductivity. Examples of such metal or metal compound include: silver, platinum, iron, tin oxide, zinc oxide, titanium oxide, barium sulfate, and potassium titanate. In addition, a metal compound such as tin oxide which is doped with antimony or aluminum may also be used. The metal or metal compound is in a form of powder preferably having a volume resistivity of from 0.05 to 50 $\Omega$.cm. An average particle diameter of the metal or metal compound is preferably from 0.01 to 0.5 μm by the consideration of the light transmittance. The term "average particle diameter" used herein means an average diameter of the primary particles.

The binder resin forming the conductive intermediate layer contains from 10 to 200 μeq/g, preferably from 50 to 150 μeq/g of —$SO_3M$ group, —COOM group, —$PO_3M_2$ group, or —$NH_3^+X^-$ group, where M is a hydrogen atom, an alkali metal atom, or an alkaline earth metal atom, and X is a monovalent anion.

Examples of such binder resin include: polyurethane resins; polyester resins; cellulose derivatives such as cellulose acetate butyrate, cellulose diacetate, and nitrocellulose; vinyl chloride resins such as vinyl chloride-vinyl acetate copolymers, vinyl chloride-vinylidene chloride copolymers, and vinyl chloride-acryl copolymers; synthetic rubbers such as styrene-butadiene copolymers; epoxy resins; and phenoxy resins, each containing from 10 to 200 μeq/g, preferably from 50 to 150 μeq/g of —$SO_3M$ group, —COOM group, —$PO_3M_2$ group, or —$NH_3^+X^-$ group (M and X are the same as those defined above). The resins may be used alone or in admixture.

A dispersing effect to the metal or metal compound powder cannot be exhibited with a content of —$SO_3M$ group, —COOM group, —$PO_3M_2$ group, or —$NH_3^+X^-$ group (M and X are the same as those defined above) in the binder resin of lower than 10 μeq/g. The content of higher than 200 μeq/g is not preferable since the dispersing effect is not improved further.

The binder resin forming the conductive intermediate layer may contain resins having none of the —$SO_3M$ group, —COOM group, —$PO_3M_2$ group, and —$NH_3^+X^-$ group (M and X are the same as those defined above) as long as the effects of the present invention are not affected. Examples of such resin include: polyurethane resins;, polyester resins; cellulose derivatives such as cellulose acetate butyrate, cellulose diacetate, and nitrocellulose; vinyl chloride resins such as vinyl chloride-vinyl acetate copolymers, vinyl chloride-vinylidene chloride copolymers, and vinyl chloride-acryl copolymers; synthetic rubbers such as styrene-butadiene copolymers; epoxy resins; and phenoxy resins.

In the magnetic recording medium according to the present invention, the ratio of the content of the conductive metal or metal compound powder to that of the binder resin, based on weight, in the conductive intermediate layer is from 8 to 13. The ratio of lower than 8 may deteriorate the running resistance of the disk particularly under a high temperature (e.g., around 60° C.). The ratio of higher than 13 deteriorates the dispersion properties of the conductive metal or metal compound powder. This badly affects the surface roughness and the light transmittance of the conductive intermediate layer. In addition, the running resistance is also deteriorated.

The conductive intermediate layer is usually from 0.01 to 5 μm thick, and preferably from 0.05 to 1 μm thick, measured as a thickness of a dry film. A larger thickness may deteriorate the light transmittance of the intermediate layer while a smaller thickness may provide only insufficient level of the conductivity.

The light transmittance of each conductive intermediate layer is usually at least 50%, and preferably at least 70% to light having wavelengths of from 700 to 900 nm, particularly 830 nm.

The magnetic recording medium according to the present invention may comprise known elements in any layers other than the conductive intermediate layer, for example, the non-magnetic support, and the magnetic layer such as magnetic powder, binders, curing agents, lubricants, abrasive materials, dispersing agents, and so on.

The non-magnetic transparent support may be any one of conventional supports applicable to the magnetic recording media as long as it has the light transmittance. The support may be formed of various plastics such as, for example, polyesters such as polyethylene terephthalate, and polyethylene naphthalate; polyolefins such as polypropylene, and polyethylene; cellulose derivatives such as cellulose acetate; polycarbonate; polyamide; and polyimide. In addition, glass may also be used. A thickness of the non-magnetic support is in an adequate range for supports. Typically, the thickness is in a range from 30 to 80 μm. The light transmittance of the non-magnetic support may be preferably at least 70%, and more preferably at least 85% to light having wavelengths of from 700 to 900 nm, particularly 830 nm.

The magnetic powder may be powder of ferromagnetic metals such as iron, nickel, and cobalt; of magnetic alloys based on these ferromagnetic metals such as iron-cobalt alloys, iron-nickel alloys, iron-cobalt-nickel alloys, iron-nickel-zinc alloys, iron-cobalt-nickel-chromium alloys, and cobalt-nickel alloys; of iron oxides such as $\gamma$-$Fe_2O_3$, $Fe_3O_4$, cobalt-containing $\gamma$-$Fe_2O_3$, and cobalt containing $Fe_3O_4$; and of metal oxides such as $CrO_2$, barium ferrites, and strontium ferrites.

The magnetic powder used preferably has the average particle diameter of 0.1 μm or smaller. With the magnetic powder having that diameter, it becomes possible to improve the light transmittance and the recording density.

The amount of the magnetic powder used preferably is from 50% to 90% by weight, and more preferably from 55% to 85% by weight, based on the amount of the ferromagnetic powder contained in the magnetic layer.

The binder may be any one of conventional binders. The binder may be, for example, polyurethane resins; polyester resins; cellulose derivatives such as cellulose acetate butyrate, cellulose diacetate, and nitrocellulose; vinyl chloride resins such as vinyl chloride-vinyl acetate copolymers, vinyl chloride-vinylidene chloride copolymers, and vinyl chloride-acryl copolymers; synthetic rubbers such as styrene-butadiene copolymers; epoxy resins; and phenoxy resins. These resins may be used alone or in admixture. A content of the binder in the magnetic layer is preferably from 2% to 50% by weight, and more preferably from 5% to 35% by weight.

The curing agent may comprise a low molecular polyisocyanate compound having two or more isocyanate groups. By using such low molecular polyisocyanate compound, a three-dimensional network can be formed in the magnetic layer to increase a mechanical strength thereof. An example of the low molecular polyisocyanate compound is tolylene diisocyanate adduct of trimethylolpropane. The amount of the low molecular polyisocyanate compound used is preferably in a range from 5% to 100% by weight relative to the binder.

The lubricant may be any one of aliphatic, fluorine, silicone, or hydrocarbon lubricants. Examples of the aliphatic lubricant include: fatty acids, fatty metal salts, fatty esters, fatty amide, and fatty alcohols. The fatty acid may be, for example, oleic acid, lauric acid, myristic acid, palmitic acid, stearic acid, and behenic acid. The fatty metal salts may be, for example, magnesium salts, aluminum salts, sodium salts, and calcium salts of the above mentioned fatty acids. The fatty esters may be, for example, butyl esters, octyl esters, and glyceride of the above mentioned fatty acids. The fatty amide may be, for example, amide of the above mentioned acids, linolamide, and caproamide. The fatty alcohol may be, for example, lauryl alcohol, myristyl alcohol, palmityl alcohol, stearyl alcohol, and oleyl alcohol. Examples of the fluorine lubricant include: perfluoroalkyl polyether, and perfluoroalkyl carboxylate. Examples of the silicone lubricant include: silicone oils and modified silicone oils. In addition, it is also possible to use solid lubricants such as molybdenum disulfide, and tungsten disulfide as well as phosphate esters. Examples of the hydrocarbon lubricant include: paraffin, squalane, and waxes. The content of the lubricant in the magnetic layer is usually in a range of from 0.1% to 20% by weight, and preferably from 1% to 10% by weight. When two magnetic layers are formed, the content of the lubricant in the upper layer may be different from that in the lower layer.

The abrasive material may be, for example, alumina, molten alumina, corundum, silicon carbide, chromium oxide, and silicon nitride. Of these, preferably used one has a relatively high hardness of 6 or higher on the Mohs' scale. An average diameter of the abrasive particles is preferably 2 μm or smaller. A content of the abrasive material in the magnetic layer is preferably from 1% to 20% by weight.

The dispersing agent may be, for example, fatty acid having from 12 to 18 carbon atoms such as capric acid, lauric acid, myristic acid, oleic acid, and linoleic acid; metal soap such as alkali metal or alkaline earth metal salts of these fatty acids; and lecithin. A content of the dispersing agent in the magnetic layer is typically in a range of from 0% to 20% by weight.

It is not necessary to contain carbon black as an anti-static agent in the magnetic layer of the magnetic recording medium according to the present invention. The carbon black may be, however, contained therein as long as the transparency of the magnetic recording medium is not deteriorated. For example, carbon black of 30 nm or smaller in an average diameter of the primary particles may be contained at an amount of 0% to 1% by weight relative to the magnetic powder. Carbon black (such as thermal carbon) of from 80 to 400 nm in the average diameter of the primary particles may be contained at an amount of 0% to 2% by weight relative to the magnetic powder. The carbon black may be any one of conventional ones such as furnace black, and graphitized carbon black. Anti-static agents other than the carbon black may also be added as long as the transparency of the magnetic recording medium is not deteriorated.

The magnetic layer is typically from 0.1 to 10 μm thick, and preferably from 0.3 to 2 μm, measured as a thickness of a dry film. An excessively thick layer may deteriorate the light transmittance while an excessively thin layer may cause deterioration of the durability and reduction of outputs.

The conductive intermediate layer and the magnetic layer according to the present invention may be formed by means of mixing and dispersing the respective components in a solvent, coating the resultant coating solution on the non-magnetic support or the conductive intermediate layer, and then drying the coatings. The conductive intermediate layer and the magnetic layer may preferably be subjected to calendering to improve smoothness of the surface.

Methods of mixing, dispersion, drying and calendering are not limited to specific ones, and any one of conventional methods can be used. In addition, there is no limitation on the order of addition of the components.

Coating may be made through any one of common methods including air doctor coating (air knife coating), blade coating, reverse-roll coating, and gravure coating. When two or more layers are formed through coating, the coating solutions for the lower layer and the upper layer may be coated simultaneously in a wet condition. Alternatively, each layer may be coated successively.

The solvent for the above mentioned coating solution may be, for example, ketones such as methyl ethyl ketone, methyl isobutyl ketone, and cyclohexanon; alcohols such as methanol, ethanol, propanol, and isopropyl alcohol; esters such as methyl acetate, ethyl acetate, and butyl acetate; ethers such as diethylether, and tetrahydrofuran; aromatic hydrocarbons such as benzene, toluene, and xylene; and aliphatic hydrocarbons such as hexane. These solvents may be used alone or in admixture.

The light transmittance of the magnetic recording medium according to the present invention is preferably 20% or higher to light having wavelengths of from 700 to 900 nm, particularly of 830 nm. The light transmittance is typically in a range from 20% to 35% except for the areas where the optical characteristics described below are changed.

The magnetic recording medium according to the present invention is capable of recording optical patterns for use in generating tracking servo signals distinguished from the remaining area according to their different optical characteristics including the light transmittance and the light reflectance. To read these optical patterns by using light permits accurate tracking on the magnetic recording medium. The optical pattern may consist of grooves formed on the surface of the magnetic recording medium. In this event, each groove has adequate width and depth. The groove may be formed by means of, for example, stamping, in which a "mold" or a stamping disk is formed bearing a template of the groove. The mold is pressed against the medium to transfer the optical pattern (groove) from the mold to the medium. Alternatively, the groove may be formed by means of laser, in which a laser beam is irradiated to the magnetic layer to cause a reaction on the focused portion, thereby etching that portion of the magnetic layer.

In addition, the optical pattern may be prerecorded by means of a method of providing a dye-containing layer in the magnetic recording medium that contains dyes and focusing a beam on a certain spot thereon to cause reaction such as decomposition of the dyes at that spot, thereby changing the optical characteristics thereof. The beam may be a light beam such as a laser beam, an ultraviolet radiation, a strobo light (electronic flash), or an electron beam.

The dye-containing layer, if formed, may serve as the magnetic layer or as the conductive intermediate layer. Alternatively, the dye-containing layer may be provided along with the magnetic layer and the conductive intermediate layers.

The applicable dye is not limited to a specific one and may be any one of conventional photosensitive dyes of which optical characteristics will change in response to radiation of light. More specifically, examples of the applicable dye include: cyanine dyes or polymethine dyes, phthalocyanine dyes, naphthalocyanine dyes, azo dyes, anthraquinone dyes, naphthoquinone dyes, pyrylium dyes, azulenium dyes, squarylium dyes, indophenol dyes, indoaniline dyes, and triarylmethane dyes.

The dye-containing layer may be formed in a conventional manner. Resins and solvents used may be one or mixture of the above mentioned conventional resins and solvents used for preparing the coating solutions.

The content of the dye depends on the type of the dye used, the thickness of the dye-containing layer, and properties of a photo-signal detector used. However, the content may be such that the light transmittance or the light reflectance will change to a measurable degree in response to normal radiation of light.

The optical pattern for use in generating the tracking servo signals may be any one of adequate patterns that permit recognition of the position of the magnetic recording medium. An example of the optical pattern is disclosed in Japanese Patent Laid Open No. 2-31387, in which a number of optical patterns are arranged concentrically on a disk-shaped medium.

Alternatively, two optical codes having different frequencies are provided on one servo track. The optical patterns may be formed by means of varying successively a phase difference between these two codes for each servo track. In this event, a signal obtained by means of synthesizing frequency components corresponding to these two codes may be recorded with a width or a depth of the servo track corresponding to the signal. The signal may be recorded as a one optical code by means of recording it as a PWM (Pulse width modulation) binary coded signal. In any events, the tracking is performed by means of detecting the phase difference between two optical codes or frequency components.

A method of recording and reproducing data according to the present invention is based on recording of a magnetic signal on the magnetic recording medium and/or reproduction of the magnetic signal recorded on the magnetic recording medium while positioning the magnetic read/write head precisely through optical tracking servo.

In the method of recording and reproducing data according to the present invention, the optical patterns formed on the magnetic recording medium can be detected readily because the magnetic recording medium used has a high transparency. Accordingly, it becomes possible to perform exact tracking. In addition, the magnetic recording medium used is superior in the anti-static properties, the surface roughness, and the running resistance. This makes it possible to provide recording and reproduction with the superior basic properties and characteristics such as the recording performance and the durability of the medium against contact to the read/write head. The read/write head is not limited to a specific one as long as those capable of reading the magnetic signal recorded on the magnetic recording medium and/or of recording the magnetic signal on the magnetic recording medium. The read/write head may thus be any one of conventional heads such as a ring-shaped head.

A method of recording and reproducing the magnetic signal may be any one of conventional methods. For example, with a ring-shaped head, the magnetic signal is recorded on the magnetic recording medium by means of a magnetic field generated between a gap. On the other hand, the magnetic recording signal is read by means of detecting with the gap the magnetic field generated by the magnetic signal recorded on the magnetic recording medium.

The magnetic recording medium used is transparent particularly to light having wavelengths of 700 nm or longer. Therefore, in the recording/reproducing method according to the present invention, the optical code recorded on the magnetic recording medium is read by using a light beam having the wavelengths of 700 nm or longer. The wavelength is not limited to a specific value as long as it is 700 nm or longer. However, the light having the wavelengths of from 700 to 900 nm can be readily commercially available through a semiconductor laser or an infrared light emitting diode (LED).

The optical pattern may be read by means of sensing, through a photo-detecting element, the reflected portion or the transmitted portion of the light of 700 nm or longer irradiated on the medium. The present invention is particularly advantageous in a case where the transmitted light is to be detected because the magnetic recording medium has a high transparency.

In the recording/reproducing method according to the present invention, the optical pattern recorded on the magnetic recording medium is normally read by using a light emitting element integrally provided with the read/write head, a photo-detecting element, and an optical system. The light emitted from the light emitting element is reflected from or transmitted through the magnetic recording medium. The optical system and the photo-detecting element detect the reflected or transmitted portion of the light to read the optical pattern, thereby generating a position signal corresponding to the position of the read/write head relative to the magnetic recording medium. The positioning of the read/write head is made according to this position signal relative to the magnetic recording medium.

A method of positioning may be any one of conventional methods depending on the optical pattern recorded on the magnetic recording medium. For example, a photo-diode that is divided into four sections may be used to calculate a difference between a target value and a measured value.

Figure 2:
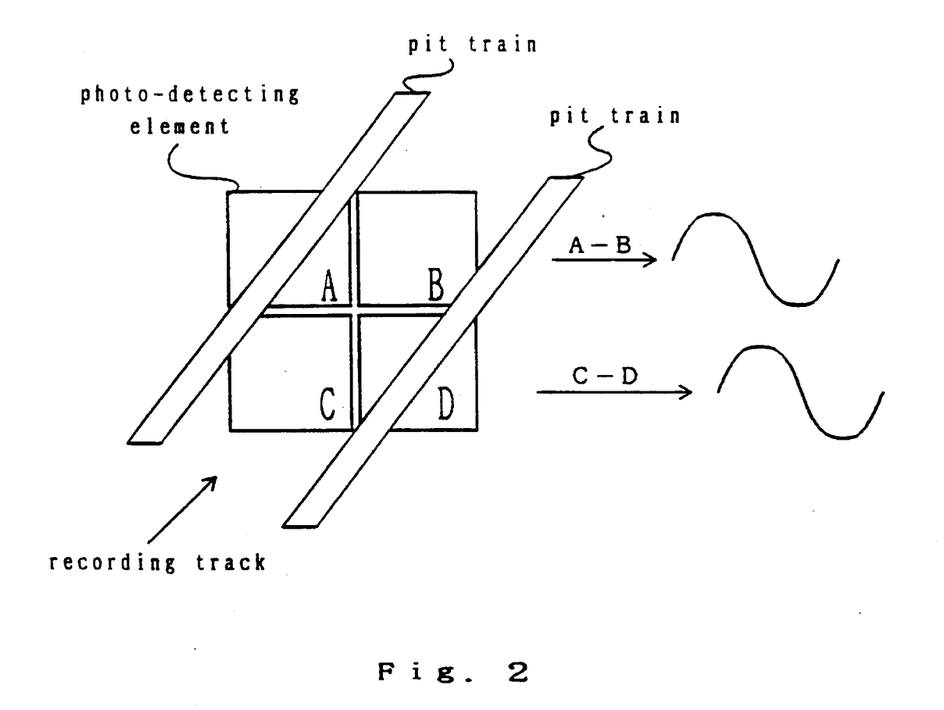
FIG. 2 is a plan view showing an example of arrangement of a photo-detecting surface of a photo-detecting element and a track on a magnetic recording medium.

FIG. 2 is a plan view showing an example of arrangement of a photo-detecting surface of a photo-detecting element and a track on a magnetic recording medium. In FIG. 2, the light reflected from the magnetic recording medium comprises, as signal components, signals based on two pit trains opposing to a recording track. The photo-detecting element consists of four unit elements A through D arranged to a square cell. The unit elements A through D generate four respective signals A through D indicative of brightness in response to the reflected light. The signal processing circuit calculates a difference between the signals B and A as well as a difference between the signals C and D.

Figure 3:
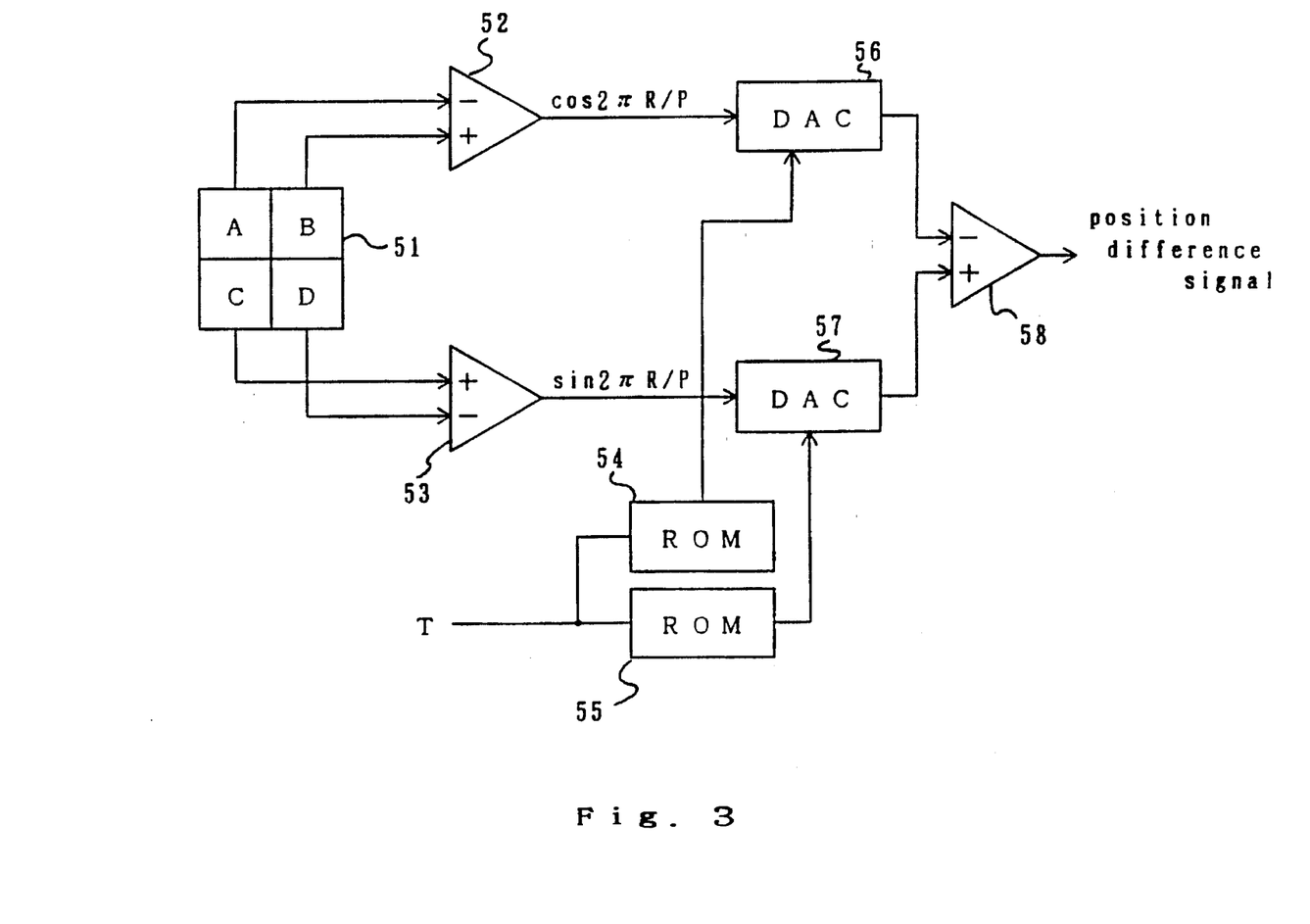
FIG. 3 is a block diagram showing an exemplified structure of a signal processing circuit.

FIG. 3 is a block diagram showing a structure of the signal processing circuit. With the read/write head being at a track position within a radius R from the center of the recording medium, a subtractor 52 subtracts the signal A from the signal B to produce a signal that is in proportion to $\cos(2\pi R/P)$. Likewise, a subtractor 53 subtracts the signal D from the signal C to produce a signal that is in proportion to $\sin(2\pi R/P)$. In this event, P represents a track pitch. On the other hand, a binary code of a target value T is supplied to address terminals of ROMs 54 and 55 where tables of "sin" and "cos" are stored, respectively, thereby producing binary codes indicative of $\sin(2\pi T/P)$ and $\cos(2\pi T/P)$, respectively. These binary codes are converted into analog signals by multiplying DA converters (DACs) 56 and 57. At the same time, the binary codes are multiplied by the respective signals supplied from the subtractors 52 and 53. A difference between the products thereof is calculated by a subtractor 58 to obtain a position difference signal given by:

$$\cos(2\pi T/P)\sin(2\pi R/P) - \sin(2\pi T/P)\cos(2\pi R/P) = \sin((2\pi R/P)-(2\pi T/P)) \doteq 2\pi(R-T)/P$$

This result is fed back to a tracking control device to ensure a tracking control with high accuracy having a difference of closer to zero.

The position signal may be generated by means of detecting the phase difference when two optical codes or an optical code obtained by means of synthesizing two types of frequency components are/is recorded on the magnetic recording medium with the phase difference therebetween being changed successively for each servo track.

Figure 4:
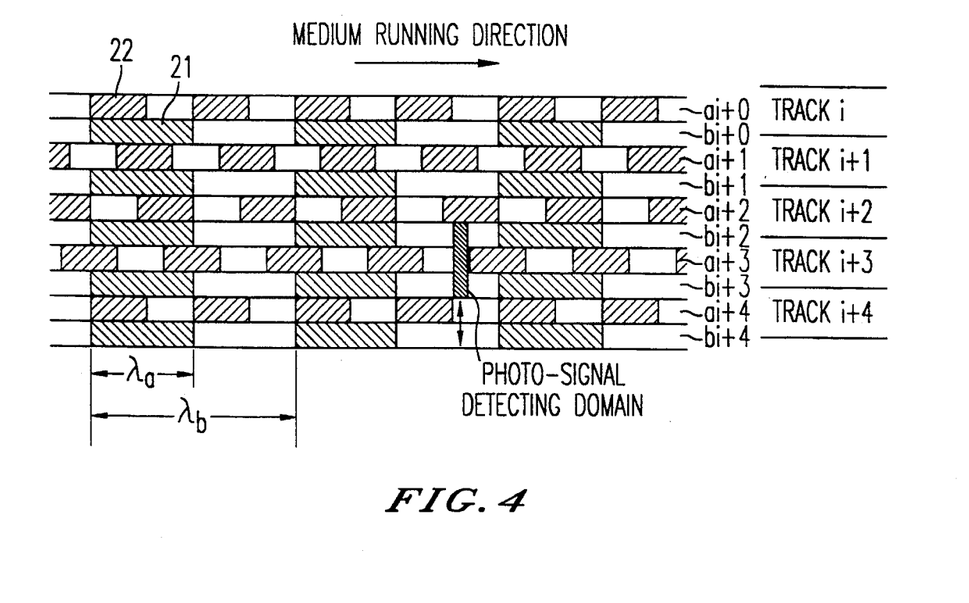
FIG. 4 is a diagrammatic plan view showing a part of a magnetic recording medium for use in describing a method of reading a phase difference.

FIG. 4 is a diagrammatic plan view showing a part of a disc-shaped magnetic recording medium for use in describing a method of reading a phase difference. As indicated, the transverse direction in the figure is the medium running direction. The longitudinal direction, perpendicular to the medium running direction, is the tracking direction.

FIG. 4 shows an example of servo tracks i through i+4 on the magnetic recording medium. First optical codes 21 and second optical codes 22 are recorded thereon as the optical codes. The first optical codes 21 are recorded at a predetermined distance along a traveling direction of the medium to form a first optical pattern consisting of fixed iteration of the first optical codes 21. The second optical codes 22 are recorded at a predetermined distance along the traveling direction of the medium to form a second optical code consisting of fixed iteration of the second optical codes 22. A pair of one row of the first optical pattern and one row of the second optical pattern is recorded on each track. In this event, the width of each track is 6 μm.

The first optical pattern is recorded on each track as the codes having the same phase. The second optical pattern has a different frequency from the first optical pattern. More specifically, let the wavelength of the first optical pattern λb be λ, the wavelength of the second optical pattern λa is λ/2. The second optical pattern has a phase successively changed by λ/8 for every track. By traveling the medium, the alternative signals are supplied from the detector that correspond to the first and the second optical patterns. The frequencies of these optical patterns differ from each other, so that the output signal comprises signals having two different frequency components.

The first and second optical patterns are alternatively recorded in the tracking direction. In this event, the width thereof is equal to 3 μm for each. The length thereof is such that signals of 40 Hz and 20 Hz can be generated in response to rotation of the medium at a rotation speed of 750 rpm.

In FIG. 4, the phase differences between the first and the second optical patterns are: 0 for the track i, λ/8 for the track i+1, λ/4 for the track i+2. Subsequently, the first and the second optical patterns are recorded with the phase difference therebetween successively shifted by λ/8 for every track.

A photo-signal detecting domain detected by the detector (photo-detecting and light emitting elements) for detecting the optical codes traveling in an integral manner with the read/write head is diagrammatically shown, being assumed that it is at an illustrated track position. Used as an input signal to the signal processing circuit is an electrical signal obtained by means of detecting with the detector the reflected or transmitted portion of the light irradiated on the photo-signal detecting domain.

It is assumed that the photo-signal detecting domain is just above the track i+3. In this event, the output of the detector is a signal corresponding to a combination of the first and the second optical patterns of the track i+3. When the read/write head travels and the photo-signal detecting domain moves toward the track i+2, the output of the detector is superimposed with a signal component corresponding to the combination of the optical patterns of the track i+2. Accordingly, a phase of a short-wave component corresponding to the second optical pattern advances. On the contrary, when the read/write head travels and the photo-signal detecting domain moves to the track i+4, the output of the detector is superimposed with a signal component corresponding to the combination of the optical patterns of the track i+4. Accordingly, a phase of a short-wave component corresponding to the second optical pattern delays.

As mentioned above, the optical patterns on the magnetic recording medium are recorded with varying phase differences for each track, so that the phase difference $\delta$ between the two optical patterns detected is increased or decreased depending on the traveling direction of the detector. Accordingly, a signal indicative of the track position can be obtained by means of generating by the signal processing circuit the position signal corresponding to the phase difference $\delta$. For example, signals "sin$\delta$" and "cos$\delta$", as functions of the track position are widely used for position control as signals for a resolver or an encoder. The output of the signal processing circuit may be used as the input signal for the tracking control device based on various known position control methods.

The phase difference may be detected by means of, for example, dividing by frequency-dividing means such as a filter the signal detected by the detector into two frequency components corresponding to the optical patterns on the medium, and detecting the phase difference between these divided components by phase difference detecting means. More specifically, the phase difference may be detected in a following manner. A long-wavelength component is obtained, by using a bandpass filter, out of the signal detected by the detector. The filtered component is subtracted from the original signal to obtain a short-wavelength component. The long-wavelength component is binarized and then frequency-multiplied by a PLL circuit. Two timing signals are generated by a timing generating circuit which have the same frequency as the short-wavelength component and that are different in phase by $\lambda/2$ therefrom. With these timing signals, the short-wavelength component is rectified in a synchronous manner to obtain SIN and COS signals corresponding to the phase difference.

These outputs are supplied to head positioning means. The head positioning means positions the read/write head. For example, the SIN and COS signals corresponding to the phase difference are converted through an A/D converter and supplied into DSPs. Each DSP is subjected to correction on a zero point and an amplitude. Thereafter, a phase difference is calculated by an arc tangent calculation. The calculated phase difference is combined as a position signal with values counted by counters that count the number of waves of the SIN and COS signals. In controlling the read/write head, a thrust command value may be calculated by using a common PIP algorithm, which is supplied to a D/A converter and a power amplifier to operate a linear actuator.

As mentioned above, according to the present invention, it is provided with a magnetic recording medium that is superior in the light transmittance, the anti-static properties, and surface roughness, and the running resistance. It is possible to obtain a magnetic recording medium that offers easy servo tracking when the optical codes are formed on such magnetic recording medium for generating the tracking servo signals distinguished from a remaining area by its different optical characteristics.

In addition, according to the present invention, it is provided with a recording/reproducing method which permits accurate positioning of a read/write head without deteriorating basic characteristics of the medium such as electro-magnetic converting properties and the durability thereof. Accordingly, it becomes possible to cope with increase of the track density on the magnetic recording medium, permitting precise servo tracking even in a high-density magnetic recording medium.

The present invention will be more readily apparent in the context of a specifically delineated set of examples and a reference. However, it should be understood that the present invention is not limited to those particular examples.

A term "part" used in the following description means part by weight.

EXAMPLE 1

A coating solution having a following composition for a conductive intermediate layer containing tin oxide of 0.03 μm diameter, a conductive metal compound, was prepared and coated on both sides of a polyethylene terephthalate support of 62 μm thick to form intermediate layers of 0.5 μm thick after dried. A magnetic coating solution having a following composition was mixed and dispersed in a ball mill, which was coated on both intermediate layers to form magnetic layers of 1 μm thick after dried. The resultant medium was subjected to calendering to smoothen the surfaces, which was punched into a 3½-inch disk to produce a floppy disk.

| <Composition of Coating Solution for Conductive Intermediate Layer (40% solid)> | |
|---|---|
| Tin Oxide | 100 parts |
| Polyester-based Polyurethane containing —SO$_3$Na group (UR8200 manufactured by TOYOBO CO., LTD.) | 11 parts |
| Methyl Ethyl Ketone (MEK) | 90 parts |
| Cyclohexanone (CHN) | 90 parts |
| Ratio of a content of tin oxide powder to that of a binder resin, based on weight ≈ 9 | |
| <Composition of Magnetic Coating> | |
| Magnetic Barium Ferrite Powder | 100 parts |
| Vinyl Chloride-Vinyl Acetate Copolymer | 10 parts |
| Polyurethane | 6 parts |
| Polyisocyanate | 5 parts |
| Alumina | |
| Butyl Stearate | 5 parts |
| MEK | 140 parts |
| CHN | 140 parts |

A groove of 20 μm long, 5 μm wide, and 0.4 μm deep was formed on the surface of the resultant floppy disk. A difference in light transmittance between the grooved portion (servo track area) and a non-grooved portion (data track area) was 10% or higher, making a sharp contrast with each other.

EXAMPLE 2

Example 1 was repeated to produce a floppy disk except that a ratio of a content of tin oxide powder to that of a binder resin, based on weight, in the conductive intermediate layer was 10.

EXAMPLE 3

Example 1 was repeated to produce a floppy disk except that a ratio of a content of tin oxide powder to that of a binder resin, based on weight, in the conductive intermediate layer was 12.

EXAMPLE 4

Example 1 was repeated to produce a floppy disk except that a ratio of a content of tin oxide powder to that of a binder resin, based on weight, in the conductive intermediate layer was 13.

COMPARATIVE EXAMPLE 1

Example 1 was repeated to produce a floppy disk except that a ratio of a content of tin oxide powder to that of a binder resin, based on weight, in the conductive intermediate layer was 4.5.

COMPARATIVE EXAMPLE 2

Comparative Example 1 was repeated to produce a floppy disk except that a polyurethane resin (polycarbonate polyurethane "MAU9204" manufactured by DAINICHISEIKA COLOR & CHEMICALS MFG. CO., LTD.) having no functional group was used in place of the Polyester-based Polyurethane containing —$SO_3Na$ group used in the conductive intermediate layer.

COMPARATIVE EXAMPLE 3

Example 1 was repeated to produce a floppy disk except that a ratio of a content of tin oxide powder to that of a binder resin, based on weight, in the conductive intermediate layer was 6.5.

COMPARATIVE EXAMPLE 4

Comparative Example 3 was repeated to produce a floppy disk except that a polyurethane resin "MAU9204" having no functional group was used in place of the Polyester-based Polyurethane containing —$SO_3Na$ group used in the conductive intermediate layer.

COMPARATIVE EXAMPLE 5

Example 1 was repeated to produce a floppy disk except that a polyurethane resin "MAU9204" having no functional group was used in place of the Polyester-based Polyurethane containing —$SO_3Na$ group used in the conductive intermediate layer.

COMPARATIVE EXAMPLE 6

Example 2 was repeated to produce a floppy disk except that a polyurethane resin "MAU9204" having no functional group was used in place of the Polyester-based Polyurethane containing —$SO_3Na$ group used in the conductive intermediate layer.

COMPARATIVE EXAMPLE 7

Example 3 was repeated to produce a floppy disk except that a polyurethane resin "MAU9204" having no functional group was used in place of the Polyester-based Polyurethane containing —$SO_3Na$ group used in the conductive intermediate layer.

COMPARATIVE EXAMPLE 8

Example 4 was repeated to produce a floppy disk except that a polyurethane resin "MAU9204" having no functional group was used in place of the Polyester-based Polyurethane containing –$SO_3Na$ group used in the conductive intermediate layer.

COMPARATIVE EXAMPLE 9

Example 1 was repeated to produce a floppy disk except that a ratio of a content of tin oxide powder to that of a binder resin, based on weight, in the conductive intermediate layer was 14.

COMPARATIVE EXAMPLE 10

Comparative Example 9 was repeated to produce a floppy disk except that a polyurethane resin "MAU9204" having no functional group was used in place of the Polyester-based Polyurethane containing —$SO_3Na$ group used in the conductive intermediate layer.

COMPARATIVE EXAMPLE 11

Example 1 was repeated to produce a floppy disk except that a ratio of a content of tin oxide powder to that of a binder resin, based on weight, in the conductive intermediate layer was 15.

Table-1 shows results of assessment on the floppy disks obtained in Examples 1 through 4 and Comparative Examples 1 through 11.

TABLE 1

| | P/B*[1] | Binder Resin | Surface Resistivity ($\Omega$/inch$^2$) | Light Transmittance (%) | Surface Roughness (Ra) (μm) | Running Resistance |
|---|---|---|---|---|---|---|
| Example 1 | 9 | containing —$SO_3Na$ | $1 \times 10^5$ | 40 or higher | 0.014 | 20 million pass or higher |
| Example 2 | 10 | containing —$SO_3Na$ | $1 \times 10^5$ | 40 or higher | 0.016 | 20 million pass or higher |
| Example 3 | 12 | containing —$SO_3Na$ | $1 \times 10^5$ | 40 or higher | 0.014 | 20 million pass or higher |
| Example 4 | 13 | containing —$SO_3Na$ | $1 \times 10^5$ | 40 or higher | 0.016 | 20 million pass or higher |
| Comp. Example 1 | 4.5 | containing —$SO_3Na$ | $5 \times 10^6$ | 40 or higher | 0.015 | 2 million pass or higher |
| Comp. Example 2 | 4.5 | Not contain | $1 \times 10^8$ | 40 or higher | 0.020 | 2 million pass or higher |
| Comp. Example 3 | 6.5 | containing —$SO_3Na$ | $1 \times 10^5$ | 40 or higher | 0.014 | 2 million pass or higher |
| Comp. | 6.5 | Not | $1 \times 10^5$ | 40 or higher | 0.022 | 2 million |

TABLE 1-continued

|  | P/B*[1] | Binder Resin | Surface Resistivity ($\Omega$/inch$^2$) | Light Transmittance (%) | Surface Roughness (Ra) ($\mu$m) | Running Resistance |
| --- | --- | --- | --- | --- | --- | --- |
| Example 4 |  | contain |  |  |  | pass or higher |
| Comp. Example 5 | 9 | Not contain | $1 \times 10^5$ | 40 or higher | 0.020 | 20 million pass or higher |
| Comp. Example 6 | 10 | Not contain | $1 \times 10^5$ | 40 or higher | 0.022 | — |
| Comp. Example 7 | 12 | Not contain | $1 \times 10^5$ | 40 or higher | 0.023 | 20 million pass or higher |
| Comp. Example 8 | 13 | Not contain | $1 \times 10^6$ | 40 or higher | 0.038 | 10 million pass or higher |
| Comp. Example 9 | 14 | containing —SO$_3$Na | $1 \times 10^8$ | 40 or higher | 0.040 | 0.5 million pass or higher |
| Comp. Example 10 | 14 | Not contain | $1 \times 10^8$ | 35 or higher | 0.044 | 0.5 million pass or higher |
| Comp. Example 11 | 15 | containing —SO$_3$Na | $1 \times 10^8$ | 30 or higher | 0.038 | — |

*[1]Ratio of a content of tin oxide powder to that of a binder resin, based on weight Methods of measurement on each item assessed are given below.

Surface resistivity was measured by using a high-resistance measuring device with an alternative current applied to both ends of the magnetic recording medium according to Japan Industrial Standard (JIS). The smaller the surface resistivity is, the higher the anti-static effect is.

The light transmittance was measured with a radiation of light having the wavelength of 830 nm. A ratio of the transmitted light to the incident light was obtained.

The surface roughness (Ra) was measured by using a Taylor-Hobson type feeler roughness tester.

The running resistance was measured on the number of passes of a read/write head up to when a flaw was generated on the surface of the magnetic recording media loaded on a 4-MB drive in an atmosphere of 60° C. and 30% RH.

As apparent from Table-1, Examples 1 through 4 exhibit superior surface resistivity, light transmittance, surface roughness, and running resistance. Comparative Examples 5 through 8 with the binder resin containing no functional group are inferior in surface roughness while the surface resistivity, the light transmittance, and the running resistance are not so bad. Comparative Examples 1 and 3 are inferior in running resistance that are small in the ratio of a content of tin oxide powder to that of the binder resin. Comparative Examples 2 and 4 are inferior in surface roughness and running resistance that are small in the ratio of a content of tin oxide powder to that of the binder resin and that use the binder resin containing no functional group. The surface resistivity is high, while the light transmittance, the surface roughness, and the running resistance are significantly bad in Comparative Examples 9 and 11 that are large in the ratio of a content of tin oxide powder to that of the binder resin, and in Comparative Example 10 that is large in the ratio of a content of tin oxide powder to that of the binder resin and that uses the binder resin containing no functional group.

EXAMPLE 5

A polymethine dye-containing layer was provided on a non-magnetic transparent support, on which the conductive intermediate layer and the magnetic layer as in Example 1 were formed. Thereafter, a light beam was irradiated on surfaces of the medium through a mask, thereby forming in a circumferential direction of the medium a portion of 20 $\mu$m long and 5 $\mu$m wide where the optical characteristics were changed. A difference in light transmittance between the portion where the optical characteristics were changed (servo track area) and a normal portion (data track area) was 10% or higher, making a sharp contrast with each other.

EXAMPLE 6

Disk-shaped magnetic recording media having optical codes as shown in FIG. 4 were produced as 3½-inch floppy disks according to the method of forming the groove as in Example 1 on the surface of the floppy disk obtained in Example 1, and the method of providing the polymethine dye-containing layer on the non-magnetic transparent support, on which the conductive intermediate layer and the magnetic layer as in Example 1 were formed, following which a light beam was irradiated on a surface of the medium through the mask. The resultant floppy disks were loaded on a magnetic recording and reproducing device to attempt position control for the read/write head. The magnetic recording and reproducing device used a typical read/write head, and a detector comprising a light emitting element for emitting and irradiating a laser beam of 830 nm, and a photo-detecting element opposed to the light emitting element through the floppy disk to detect a portion of the laser beam transmitted through the floppy disk. The detector was provided integrally with the read/write head. The magnetic recording and reproducing device further comprises a signal processing circuit for use in frequency-dividing the output of the detector to generate a position signal corresponding to a phase difference $\delta$, and a driving system for driving the read/write head in a tracking direction. As a result, it had found that the tracking was made accurately in all cases.

We claim:

1. A magnetic recording medium having a light transmittance of 20% or higher to light having wavelengths of from 700 to 900 nm, comprising a non-magnetic transparent support, a magnetic layer comprising a binder resin and a magnetic powder, and an electrically conductive intermediate layer formed between the non-magnetic transparent support and the magnetic layer, the electrically conductive intermediate layer comprising a powder of an electrically conductive metal or metal compound and a binder resin, and an optical pattern formed on said magnetic layer capable of generating a tracking servo signal distinguishable from the remaining magnetic layer by its difference in optical characteristics, the light transmittance of the electrically conductive intermediate layer to light having a wavelength of 830 nm being 50% or more, wherein:

the binder resin of the intermediate layer contains from 10 to 200 µg of a functional group selected from the group consisting of —COOM group, —PO$_3$M$_2$ group, and —NH$_3^+$X$^-$ group, where M is a hydrogen atom, an alkali metal atom, or an alkaline earth metal atom, and X is a monovalent anion, and the ratio, by weight, of the content of the powder of the electrically conductive metal or metal compound to that of the binder resin present in the conductive intermediate layer is from 8 to 13.

2. A magnetic recording medium as claimed in claim 1, wherein the conductive metal compound is tin oxide.

3. A magnetic recording medium as claimed in claim 1, wherein the binder resin of the intermediate layer is selected from the group consisting of polyurethane resins, polyester resins, cellulose derivatives, vinyl chloride resins, synthetic rubbers, epoxy resins, and phenoxy resins, each containing from 10 to 200 µeq/g of —SO$_3$M group, —COOM group, —PO$_3$M$_2$ group, or —NH$_3^+$X$^-$ group, where M is a hydrogen atom, an alkali metal atom, or an alkaline earth metal atom, and X is a monovalent anion.

4. A magnetic recording medium as claimed in claim 1, wherein the optical pattern is formed as a groove on the surface of the magnetic layer.

5. A magnetic recording medium as claimed in claim 1, further comprising a dye-containing layer located between the magnetic layer and the intermediate layer, the transparent support and the intermediate layer, or on the surface of the magnetic layer, wherein the optical pattern is formed on the dye containing layer by means of changing the optical characteristics of a predetermined portion of the dye-containing layer, on which a light beam is irradiated.

6. A recording/reproducing method for recording a magnetic signal on a magnetic recording medium and/or reproducing the magnetic signal recorded on the magnetic recording medium, wherein the magnetic recording medium has a light transmittance of 20% or higher to light having wavelengths of from 700 to 900 nm, having a magnetic layer comprising a binder resin and a magnetic powder as a recording layer, a non-magnetic transparent support, and an electrically conductive intermediate layer formed between the magnetic layer and the non-magnetic transparent support, the electrically conductive intermediate layer comprising a powder of an electrically conductive metal or metal compound and a binder resin, and an optical pattern formed on the magnetic layer of said magnetic recording medium capable of generating a tracking servo signal distinguishable from the remaining magnetic layer by its difference in optical characteristics, the light transmittance of the electrically conductive intermediate layer to light having a wavelength of 830 nm being 50% or more, the binder resin of the intermediate layer containing from 10 to 200 µq/g of a functional group selected from the group consisting of —SO$_3$M group, —COOM group, —PO$_3$M$_2$ group, and —NH$_3^+$X$^-$ group, where M is a hydrogen atom, an alkali metal atom, or an alkaline earth metal atom, and X is a monovalent anion, the ratio, by weight, of the content of the electrically conductive metal or metal compound powder to that of the binder resin present in the electrically conductive intermediate layer being from 8 to 13, wherein the recording/reproducing method comprises the steps of:

recording and reproducing a magnetic data while reading through optical means the optical pattern recorded on the magnetic recording medium to perform tracking by a read/write head.

7. A recording/reproducing method as claimed in claim 6, wherein the optical pattern is a groove formed on the surface of the magnetic layer.

8. A recording/reproducing method as claimed in claim 6, wherein the magnetic recording medium further comprises a dye-containing layer located between the magnetic layer and the intermediate layer, the transparent support and the intermediate layer or on the surface of the magnetic layer, wherein the optical pattern recorded on the magnetic recording medium is formed on the dye-containing layer by means of changing the optical characteristics of a predetermined portion of the dye-containing layer, on which a light beam is irradiated.

* * * * *

UNITED STATES PATENT AND TRADEMARK OFFICE
CERTIFICATE OF CORRECTION

PATENT NO. : 5,604,013
DATED : February 18, 1997
INVENTOR(S) : Yushi YAMAGUCHI, et al.

It is certified that error appears in the above-indentified patent and that said Letters Patent is hereby corrected as shown below:

On the title page, the Foreign Application Priority Data is missing, it should read:

--[30]  Jun. 11, 1993   [JP]   Japan.....140756--

Signed and Sealed this

First Day of July, 1997

Attest:

BRUCE LEHMAN

Attesting Officer

Commissioner of Patents and Trademarks